United States Patent [19]

Barkdoll

[11] 3,940,207

[45] Feb. 24, 1976

[54] SOFT, TOUGH LOW REFRACTIVE INDEX CONTACT LENSES

[75] Inventor: Archie E. Barkdoll, Hockessin, Del.

[73] Assignee: E. I. Du Pont de Nemours and Company, Wilmington, Del.

[22] Filed: Feb. 26, 1974

[21] Appl. No.: 445,916

Related U.S. Application Data

[63] Continuation-in-part of Ser. No. 152,076, June 11, 1971, abandoned.

[52] U.S. Cl. .............................. 351/160; 260/87.5 A
[51] Int. Cl.² ................................................. G02C 7/04
[58] Field of Search ....................................... 351/160

[56] References Cited
UNITED STATES PATENTS

| | | | |
|---|---|---|---|
| 3,132,123 | 5/1964 | Harris et al. | 260/87.5 |
| 3,228,741 | 1/1966 | Becker | 351/160 |
| 3,542,461 | 11/1970 | Girard et al. | 351/160 |
| 3,808,179 | 4/1974 | Gaylord | 351/160 X |

*Primary Examiner*—David H. Rubin
*Attorney, Agent, or Firm*—Anthony P. Mentis

[57] ABSTRACT

Disclosed is a soft, tough, contact lens for the human eye constructed of fluorine-containing polymers, said lens having a Clash-Berg torsion modulus of 95–1000 lb/sq. in. and a refractive index approximating that of human tears.

12 Claims, No Drawings

SOFT, TOUGH LOW REFRACTIVE INDEX CONTACT LENSES

RELATED APPLICATIONS

This application is a continuation-in-part of my application Ser. No. 152,076 filed June 11, 1971, now abandoned.

BACKGROUND OF THE INVENTION

1. Field of the Invention

This invention relates to transparent soft, tough contact lenses for correcting vision deficiencies of the human eye.

2. Description of the Prior Art

Contact lenses are of two general types, scleral and corneal. Lenses of the scleral type cover a substantial area of the eye during use and seal off circulation of tears and the atmosphere. This causes partial asphyxiation which affects the metabolism and vision of the eye. The more recently developed corneal lenses, because of their relatively smaller size and lighter weight, cause less irritation to the cornea and have achieved greater acceptance. However, the "break in" period necessary to accustom the cornea of the wearer to a corneal lens usually extends over a considerable period of time. Some persons have found contact lenses to be intolerable because of the eye irritation resulting during and after any extended period of continuous wear.

Contact lenses of both the corneal and scleral types have been commonly constructed of poly(methyl methacrylate) (PMMA). A lens made of such material is hard and stiff and when introduced for the first time on the eye of a person, the sensation is that of a foreign body. A fraction of the people who try PMMA lenses become adapted after a break-in period and can successfully wear the lenses. However, a larger fraction of the individuals who attempt to wear PMMA lenses never become wearers since they cannot adapt to such hard and stiff lenses because of discomfort, irritation, excessive tearing, and the like. Even those individuals who do adapt successfully to PMMA lenses, however, suffer an awareness of the lens in the eye.

Contact lenses have also been made from fluorinated copolymers, as for example, those disclosed in U.S. Pat. No. 3,542,461 issued to Girard et al. These lens are also hard and stiff and suffer from the same disadvantages as the PMMA lenses.

Contact lenses have also been made from other materials such as hydrogels and silicones. These are exemplified by U.S. Pat. No. 3,220,960 to Wichterle et al. and U.S. Pat. No. 3,228,741 to Becker, respectively. Lenses made of these materials are referred to as soft lenses and are an improvement over hard and stiff lenses in being very comfortable, a property which is immediately apparent to the wearer. However, the hydrogel and silicone lenses have serious drawbacks which include poor or variable visual acuity resulting from difficulties in their manufacture and, in the case of the hydrogel lens, variable water absorption, tendency to absorb foreign substances, including tobacco smoke, bacteria, fluorescein, wetting solutions, mascara, and the necessity for daily sterilization. Hydrogel lenses, after a period of prolonged use, may acquire proteinaceoous deposits which can lead to physical discomfort and lessened visual acuity. In addition, the hydrogel and silicon lenses are weak and subject to damage by tearing and breaking. A discussion of the disadvantages of such lenses is found in "Precision-Cosmet Digest," Vol. 5, No. 9, April 1965.

SUMMARY OF THE INVENTION

The present invention comprises a soft, wettable, transparent contact lens for the eye constructed from at least one soft, tough, fluorine-containing polyer said lens having a concavo-convex structure with the concave surface conforming substantially to the shape of the eye surface, an optical zone, a refractive index in the range 1.30 to 1.40, and a Clash-Berg torsion modulus in the range of about 95 to about 1000 psi.

Preferred are such polymers having a Shore Durometer (A) hardness of 90 or less, a tensile strength (break) of at least about 100 psi, an elongation (break) of at least about 160 percent and a tear strength of at least about 5 lb/linear inch.

The softness of the lenses, as evidenced by the Clash-Berg torsion modulus values, insures excellent comfort to the wearer. In fact, comfort is equal to or greater than that observed with hydrogel and silicone lenses. At the same time the lenses are tough and strong enough to maintain constant visual acuity and to resist damage by tearing, breakage, abrasion or irreversible elastic deformation. Furthermore, the inert nature of the fluorine-containing polymer insures that the lenses will not absorb bacteria, lens-wetting and sterilizing solutions, fluorescein, tobacco smoke, mascara and other deleterious materials.

The lenses described herein are also characterized by a refractive index of between about 1.30 to 1.40. It is preferred that the refractive index be close to that of tears which is 1.336.

Because of the low refractive index of the lenses of this invention, they may be modified to obtain benefits not possible with lenses of higher refractive indices. For example, the posterior lens surface can be spherical or aspherical over part or all of the surfaces; or it may have one or more peripheral curves to improve fit and comfort; or it may be textured, patterned or channeled to improve the flow of oxygen and tears to the eye, all without adversely affecting visual acuity.

An additional advantage of the present lenses is that they can be made quickly and easily by compression molding, with heating times ranging from about 2 to 7.5 minutes. After the heating, the lenses are removed from the mold and edged. In contrast, manufacture of hydrogel and silicon lenses involve relatively slow polymerization or curing steps which greatly increase the time required for lens preparation and add to their cost. For example U.S. Pat. No. 3,696,254 (example 1) discloses that a period of 6 hours is needed for polymerization and to produce a hydrogel lens in unhydrated form. The process is further complicated by being carried out in a rotating mold and in an oxygenfree atmosphere. The lens must then be edged and swollen (hydrated) to its final form.

DETAILS OF THE INVENTION

Soft, tough fluorine-containing polymers include those listed below. Table I gives their various properties and also shows some prior art materials for comparison.

| Polymer | Abbreviation | U.S. Patent Reference |
|---|---|---|
| Tetrafluoroethylene/perfluoro (methyl vinyl ether) | (TFE/P$_f$MVE) | 3,132,123 |
| Tetrafluoroethylene/perfluoro (methyl vinyl ether) plasticized with polyfluoropropylene oxide oil | | 3,484,503 |
| Tetrafluoroethylene/perfluoro (methyl vinyl ether)/vinylidene fluoride | TFE/P$_f$MVE/VF$_2$ | 3,235,537 |
| Tetrafluoroethylene/perfluoro [2(2-fluorosulfonylethoxy) propyl vinyl ether] | TFE/PSEPVE | 3,282,875 |
| Vinylidene fluoride/hexafluoropropylene/tetrafluoroethylene | VF$_2$/HFP/TFE | 2,968,649 |
| Vinylidene fluoride/hexafluoropropylene | VF$_2$/HFP | 3,051,677 |

Presently preferred are TFE/P$_f$MVE and TFE/PSEPVE for their excellent combination of properties such as high clarity and dimensional stability, etc.

Centibarrers or more, at 1 PSIG, are desirable. Permeabilities somewhat below about 500 Centibarrers may, however, also prove beneficial. It should be understood

TABLE I

| No | Polymer | Polymer Composition (mol ratio) | Hardness Shore Durometer[1] (A) | (D) | Clash-Berg[2] Torsion, psi | Tensile[3] Strength (break) psi | Elongation (break)[3] % | Tear[4] Strength lbs./linear in. | 25[5] n$_D^{25[5]}$ |
|---|---|---|---|---|---|---|---|---|---|
| 1 | TFE/P$_f$MVE | 64:36 | 67 | — | 127 | 500–885 | 160–200 | 15.1–17.6 | 1.3276 |
| 2 | TFE/P$_f$MVE | 64:36 | 56, 57 | — | 132 | — | — | — | 1.3270 |
| 3 | TFE/P$_f$MVE | 70:30 (wt.ratio) | 64, 65 | — | 285 | 1800–1850 | 210–220 | 25.7 | 1.3300 |
| 4 | TFE/PSEPVE | 6.5:1 | 90 | — | 728 | 1900 | 280 | 76.3 | 1.3389 |
| 5 | TFE/PSEPVE | 8.3:1 | 80, 81 | — | 873 | 2800–2900 | 300 | 78.4 | 1.3400 |
| 6 | TFE/P$_f$MVE/VF$_2$ | 12:17:71 | 47–49 | — | <95 | 450 | 560 | 43 | 1.3700 |
| 7 | VF$_2$/HFP | 78:22 | 35, 36 | — | <109 | 160–165 | >1000 | 19.6–21.3 | 1.3713 |
| 8 | VF$_2$/HFP/TFE | 61:17.3:21.7 | 43 | — | 102 | 170–200 | 900–>1000 | 24.5–26.0 | 1.3617 |
| 9 | TFE/P$_f$MVE-poly(perfluoropropylene oxide) oil | No. 2 containing 10 wt. % oil | 65 | — | — | — | — | — | 1.3240 |
| 10 | Silicone Rubber ("Sylgard" 184) Becker U.S. 3,228,741 | | 56(80) | — | <144 | 410–850 | 80 | 0.69 | 1.430[7] |
| 11 | Hydrogel Wichterle, Ex. 8 Br. 1,035,877 | | 30–35 | — | <101 | 38–71 | 20 | Too low to measure | 1.4275 |
| 12 | Polyperfluoroalkyl-ethyl methacrylate Girard, Ex. 2 U.S. 3,542,461 | | 92–96 | 48 | 10,289 | 600 | 10 | — | 1.370 |
| 13 | Polyperfluoroalkyl-ethyl methacrylate Girard, Ex. 3 U.S. 3,542,461 | | 93–96 | 50 | — | — | — | — | 1.368 |
| 14 | Fluorinated Copolymer of ethylene with propylene (Teflon FEP-110) DeCarle, Br. 1,045,665 | | | 60–65[6] | 24,037 | 2700–3100[6] | 250–330[6] | 110–143 | 1.338[6] |
| 15 | Polychlorotrifluoro-ethylene (Kel-F) Stroop, U. S. 3,475,521 | | | R75–R95[6] | 38,981 | 4500–6000[6] | 80–250[6] | 90–96 | 1.425[6] |

NOTES:
[1] Conventional hardness measurements employing type A and D Shore Durometer in accordance with ASTM D2240-68. Some of the reported values represent an average of more than one measurement.
[2] Conventional measurement of the stiffness of a plastic by means of a torsion test, in accordance with ASTM-D1043-72 using a Tinius Olsen Torsion Stiffness Tester modified to the extent that the manually operated brake was replaced by an electromagnetic clutch with a time delay switch mounted on the deflection head. The values were obtained at 74°F.
[3] ASTM-D412-68. Standard Method of Tension Testing of Vulcanized Rubber.
[4] Conventional measurements of tear resistance, as set forth in ASTM-D470-71 (p. 251).
[5] Refractive Index, measured by standard techniques on an Abbe Refractometer.
[6] Data from 1973–1974 Modern Plastics Encyclopedia.
[7] Data taken from Dow Corning Bulletin 67-005, Information About Electrical/Electronic Materials, April 1970.

Lens Permeability

Permeability of the novel lenses to $O_2$ and $CO_2$ has been found to be a valuable property. Good permeability is desirable in that oxygen can permeate through the lens to nourish the eye and metabolic waste (carbon dioxide) can permeate through the lens and away from the eye. Lens permeability is an important asset even though patterns can be employed to aid tear flow, etc. Oxygen and carbon dioxide permeabilities of about 500 that the further the permeability ranges below about 500 Centibarrers, the more impermeable the lenses and the less the beneficial effect.

The contact lenses of the invention are significantly more permeable to oxygen and carbon dioxide than various art polymers as represented by poly(methyl methacrylate), PMMA. The following comparisons show the increased oxygen permeabilities of some of the polymers used in the novel contact lenses as compared to the prior art material PMMA.

| Polymer | O₂ Permeability Centibarrers Pressure | | |
|---|---|---|---|
| | 1 Psig | 15 Psig | 100 Psig |
| PMMA | — | — | 13* |
| TFE/P₁MVE | 1,190 | 1,202 | |
| TFE/P₁MVE plasticized with 10% poly(perfluoropropylene oxide)oils | 2,740 | 1,150 | |

*Permeability is nil at lower pressures.

Bifocal Lenses

The soft, tough lenses of this invention can be constructed in a variety of ways to provide for the refractive and physical requirements of different individuals. Among the several types of lenses are the soft, tough single vision lenses having symmetrical spherical anterior and posterior curves. This type of lens meets the needs of the majority of contact lens patients. Other types of lenses falling within the scope of this invention include: (1) soft, tough toric lenses having non-spherical anterior and/or posterior curves; and (2) soft, tough bifocal lenses which are designed to provide near and far vision for individuals whose eyes have lost accomodative power.

Among the several types of bifocal lenses which may be constructed are (a) the peripheral near-segment bifocal lenses in which distant vision is provided by the curves on the central segment and near vision by the curves on the peripheral segment; (b) upper and lower segment bifocal lenses in which distant vision is provided by the curves on the upper segment and near vision by the curves on the lower segment. Other types of lenses considered to be within the scope of this invention are prism ballast lenses, truncated lenses and lenticular lenses.

Construction of Lenses

Two general methods in use for manufacture of contact lenses constructed of poly (methyl methacrylate) or other hard material are as follows: (1) cutting of lenses from blanks on a radiusing lathe, followed by polishing and edging with a grinding or cutting device, and (2) compression molding of the plastic with precision molds of glass or steel, followed by edging by cutting or grinding.

The lenses of this invention, because of their soft, tough nature, are preferably fashioned by compression molding, using precision molds constructed of suitable materials such as glass, stainless steel, carbon steel, carbides such as WC and TiC, brass, Ni- and Cr-plated steel or brass, and the like. By employing suitably constructed male and female mold forces, lenses can be molded which have anterior and posterior surfaces with the desired curvatures and degree of smoothness (polish) and which also have adequately tapered and rounded edges, so that the molding operation produces a finished lens, ready for wear. Or, if desired, the mold forces can be constructed so as to produce a so-called semi-finished lens, that is, one with proper anterior and posterior curves but which has not been edged. The lens is subsequently edged to provide a comfortable fit.

Wettability is an essential requirement for corneal lenses in order to provide comfort and good visual acuity. Wettability is achieved by altering the hydrophobic surface to a hydrophilic surface by any of several methods that are known to the art.

One generally applicable method involves subjecting the lenses to the action of a glow discharge at a low pressure of, say, 1 mm of Hg for a limited time of, say, 15 seconds. The lens is then wettable when placed in water. In a variation of this method, a vinyl monomer containing a hydrophilic group, e.g., acrylic acid is admitted to the lens, in either liquid or vapor form, after its exposure to the discharge but before exposure to air. This results in formation of a wettable hydrophilic film on the lens.

Another method for imparting wettability which is applicable to the polymers of this invention consists in etching the surface of the lens with sodium or other alkali metal as a solution in anhydrous $NH_3$ or as a complex with naphthalene in solution or in suspension in tetrahydrofuran or other inert ethers, followed by exposure to water to destroy excess alkali metal. In some instances the treatment leaves a brown discoloration on the surface which is removed, frequently with enhancement of wetting, by exposure of the lens to warm commercial household bleach solution for several minutes. The method is particularly applicable to TFE/P₁MVE.

Another polymer, TFE/PSEPVE, is rendered wettable by converting hydrophobic surface sulfonyl fluoride ($-SO_2F$) groups to more hydrophilic groups. For example, wettability is imparted by brief immersion of lenses of this polymer in ethanolamine, diethanolamine, or aqueous 5% sodium hydroxide solution, and forming the groups $-SO_2NHCH_2CH_2OH$, $-SO_2N(CH_2CH_2OH)_2$ or $-SO_3Na$, respectively, on the surface.

SPECIFIC EMBODIMENTS OF THE INVENTION

The following examples are meant to illustrate but not to limit the invention.

EXAMPLE 1

A quantity of TFE/P₁MVE copolymer was placed in a conventionally prepared steel lens mold previously heated to 200°C., allowed to stand for 2 minutes, and a total force of 100 lbs. then applied to the mold. The sample was maintained at 200°C and 100 lbs pressure for 5 minutes, and then quickly cooled to room temperature while the pressure was maintained.

The mold was then opened and the lens then removed. The lens was transparent, colorless, soft, and flexible, yet tough and elastic, with well-feathered, smooth edges. The edge of the lens was good enough so that it could be worn comfortably without further modification. It weighed 53.5 mg and had a diameter of 12 mm and a central thickness of 0.157 mm.

The lens was made wettable with water by subjecting it to a corona discharge at reduced pressure. The wetted lens was then placed on the right eye of a test subject who at the same time was wearing a conventional PMMA corneal lens as a control on his left eye. The lens centered perfectly and the subject reported the TFE/P₁MVE lens to be more comfortable than the methacrylate lens and to be comparable in comfort with previously worn hydrogel contact lenses of the Wichterle type. The subject experienced none of the "scratchiness", even when blinking, which he associated with PMMA corneal lenses.

EXAMPLE 2

A quantity of TFE/P,MVE copolymer, in the form of a four-layer sandwich of pieces cut from 25-mil film, was placed in a conventional steel lens mold heated to 200°C. After standing for 1 minute to attain temperature, the polymer was molded at 200°C and 125 lbs total mold pressure for 1 minute, and then cooled to room temperature under pressure. A well-formed lens was obtained; weight, 78.5 mg; diameter, 12.9 mm; central thickness, 0.358 mm. The lens required edging, including removal of some flash on the periphery.

EXAMPLE 3

A piece of 55-mil film of TFE/P,MVE/VF$_2$ terpolymer was placed in a preheated lens mold of Example 2 and molded for 1 minute at 220°C and 75 lbs total pressure. The lens was cooled to room temperature under pressure and removed from the mold. It was colorless, transparent, soft, rubbery, and tough with some peripheral flash; weight, 101.9 mg; diameter, 13.2 mm; central thickness, 0.256 mm.

EXAMPLE 4

A quantity of TFE/PSEPVE copolymer in the form of stacked pieces of 9-mil film was placed in the steel lens mold of Example 2, preheated to 250°C. After allowing 1 minute for temperature equilibration, the material was molded for 30 seconds at 250°C and 100 lbs total pressure. The mold was cooled to room temperatures under pressure and the lens removed. The lens was transparent, soft, tough, and flexible; weight, 45.5 mg; diameter, 10.6 mm; central thickness, 0.262 mm.

EXAMPLE 5

A quantity of TFE/HFP/VF$_2$ terpolymer containing 57 wt % of VF$_2$ was preheated in the steel lens mold of Example 2 for 1 minute at 180°C and then subjected to the following molding cycle: 30 seconds at 180°C and 75 lbs pressure, followed by 30 seconds at 180°C and 150 lbs. the mold was cooled to room temperature under pressure and the lens removed. The well-formed lens weighed 49.9 mg and had a diameter of 11.2 mm, and a central thickness of 0.218 mm.

EXAMPLE 6

A quantity of VF$_2$/HFP copolymer was placed in the steel lens mold of Example 2, and heated to 180°C. After standing for 1 minute for temperature-equilibration, the sample was subjected to the following mold cycle: 30 seconds at 180°C and 75 lbs pressure followed by 30 seconds at 180°C and 100 lbs pressure. The mold was cooled under pressure and the lens removed. The well-formed lens was tough and rubbery; weight, 120.4 mg; diameter, 13.7 mm; central thickness, 0.348 mm.

EXAMPLE 7

A quantity of TFE/P,MVE copolymer in the form of stacked pieces of 25-mil sheet was placed in a conventional lens mold preheated to 280°C. The polymer was allowed to stand for 3 minutes for temperature equilibration and the pressure then raised to 75 lbs total pressure. Immediately thereafter, the lens was cooled rapidly to room temperature with maintenance of pressure. The well-formed lens weighed 121.8 mg and had a diameter, including flash, of 13.7 mm and a central thickness of 0.366 mm.

EXAMPLE 8

A quantity of TFE/P,MVE (64/36 mol ratio) copolymer was placed in a conventional lens mold previously heated to 260°C, allowed to stand at 260° for 5 min. and a total force of 85 lbs then applied to the mold. The mold was then quickly cooled to room temperature while the pressure was maintained. The mold was opened and the lens removed. The well-formed lens had a central thickness of 0.34 mm and a total weight, including flash, of 132.8 mg. The flash was cut off and the lens was edged.

The lens was then made wettable by the procedure described in Example 1, and the wetted lens placed on the right eye of a test subject. The test subject's immediate reaction was that the lens was very comfortable and couldn't be felt except for a slight awareness on the lower region of the sclera. The lens remained comfortable during a wearing period of 1.5 hours. The test subject did not experience flare or photophobia outdoors with the lens and edema was absent at the end of the wearing period. The test subject's visual acuity with the lens was 20/15, when wearing a 2D auxiliary lens to compensate for a slight overcorrection in the lens. This indicated excellent optics for the lens.

EXAMPLE 9

A block of TFE/P,MVE (64/36 mol ratio) copolymer was placed in a conventional lens mold previously heated to 260°, allowed to stand for 5 min. at temperature and a total force of 50 lbs applied to the mold. The mold was then quickly cooled to room temperature while the pressure was maintained. The mold was opened and the lens removed. The lens weighed 126.2 mg and had a central thickness of 0.67 mm.

The subsequently edged lens weighed 98.5 mg; the diameter of the optic zone was 7.2 mm and the overall diameter was 12.6 mm. The lens was made wettable as described in Example 1. When worn by a person having 20/400 uncorrected vision, the lens was very comfortable and provided visual acuity of 20/15.

EXAMPLE 10

A block of TFE/P,MVE (64/36 mol ratio) copolymer was placed in a conventional lens mold previously heated to 260°C, allowed to stand for 5 min. at temperature and a total force of 50 lbs. then applied to the mold. The mold was then quickly cooled to room temperature while the pressure was maintained. The mold was opened and the lens removed. The well-formed lens had a central thickness of 0.59 mm and weighed 114.0 mg.

The subsequently edged lens weighed 81.2 mg; the optic zone had a diameter of 7.2 mm and the overall diameter was 12.6 mm. The lens was made wettable as described in Example 1 and worn by a test person. The visual acuity of said person (having 20/400 uncorrected vision) was improved to 20/20 with the novel lens of this invention.

EXAMPLE 11

A block of TFE/P,MVE (64/36 mol ratio) copolymer was placed in a conventional lens mold previously heated to 260°C, allowed to stand for 5 min. at temperature and a total force of 25 lbs. then applied to the mold. The mold was then quickly cooled to room temperature while the pressure was maintained. The mold was opened and the lens removed. the lens had a central thickness of 0.63 mm and weighed 89.2 mg including the flash.

The subsequently edged lens weighed 87.1 mg; the optic zone had a diameter of 7.2 mm and the overall diameter was 11.9 mm. The lens was made wettable as described in Example 1. The lens provided a person with visual acuity of 20/25 while wearing an auxiliary ophthalmic lens of −0.75D to correct for a slight difference in the power or the lens and the refractive requirement of that person.

EXAMPLE 12

A quantity of TFE/P,MVE copolymer plasticized with 10 wt % of a poly(perfluoropropylene oxide) oil, in the form of a stacked sandwich of pieces cut from 16-mil film, was placed in a conventional lens mold preheated to 240°C. After standing for 5 min. at 240°C, a total force of 100 lbs. was applied to the assembly, which was then cooled to room temperature with maintenance of pressure. A well-formed lens was obtained; weight 138.3 mg; central thickness 0.42 mm.

The subsequently edged lens weighed 137.7 mg. The overall diameter was 13.5 mm and the diameter of the optic zone was 8 mm. The lens was made wettable as described in Example 1. The lens was placed on a test subject's eye. It provided visual acuity of 20/15 while the subject was also wearing a −1.00D auxiliary ophthalmic lens to correct for a slight difference between the power of the lens and the refractive requirement of the subject.

The poly(perfluoropropylene oxide)-plasticized TFE/P,MVE copolymer was prepared as follows. A quantity of TFE/P,MVE (64/36 mol ratio) copolymer was dissolved in dichlorooctafluorobutane and to the solution was added a quantity of poly(perfluoropropylene oxide) oil equal to 10% of the combined weight of polymer and plasticizer. The solution was filtered and the polymer recovered by evaporation of the solvent. The plasticized polymer was transparent, colorless, tough and elastomeric, and somewhat softer to the touch than unplasticized TFE/P,MVE. A 16-mil film was prepared by pressing a quantity of the plasticized polymer between 2 sheets of polyimide film at 260°C.

I claim:

1. A soft, wettable, transparent contact lens for the eye constructed from at least one soft, tough, fluorine-containing polymer selected from the group consisting of tetrafluoroethylene/perfluoro(methyl vinyl ether), tetrafluoroethylene/perfluoro(methyl vinyl ether)-/vinylidene fluoride, tetrafluoroethylene/perfluoro[2(2-fluorosulfonylethoxy)propyl vinyl ether], vinylidene fluoride/hexafluoropropylene/tetrafluoroethylene, and vinylidene fluoride/hexafluoropropylene said lens having a concavoconvex structure with the concave surface conforming substantially to the shape of the eye surface, an optical zone, a refractive index in the range 1.3 to 1.4, a Clash-Berg torsion modulus in the range about 95 to about 1000 pounds per square inch, a Shore Durometer (A) hardness of 90 or less, a tensile strength (break) of at least about 100 psi, an elongation (break) of at least about 160 percent and a tear strength of at least about 5 lb/linear inch.

2. A lens according to claim 1 in which the polymer is tetrafluoroethylene/perfluoro(methyl vinyl ether).

3. A lens according to claim 2 in which the mol ratio of tetrafluoroethylene to perfluoro(methyl vinyl ether) is 64:36.

4. A lens according to claim 1 in which the polymer is tetrafluoroethylene/perfluoro(methyl vinyl ether)-/vinylidene fluoride.

5. A lens according to claim 4 in which the mol ratio of tetrafluoroethylene to perfluoro(methyl vinyl ether) to vinylidene fluoride is 12:17:71.

6. A lens according to claim 1 in which the polymer is tetrafluoroethylene/perfluoro[2(2-fluorosulfonylethoxy)propyl vinyl ether].

7. A lens according to claim 6 in which the mol ratio of tetrafluoroethylene to perfluoro[2ranges 2-fluorosulfonylethoxy)propyl vinyl ether] range from 6.5:1 to 8.3:1.

8. A lens according to claim 1 in which the polymer is vinylidene fluoride/hexafluoropropylene/tetrafluoroethylene.

9. A lens according to claim 8 in which the mol ratio of vinylidene fluoride to hexafluoropropylene to tetrafluoroethylene is 61:17.3:21.7.

10. A lens according to claim 1, wherein the polymer is tetrafluoroethylene/perfluoro(methyl vinyl ether) plasticized with poly(hexafluoropropylene oxide) oil.

11. A lens according to claim 1, wherein the polymer is vinylidene fluoride/hexafluoropropylene.

12. A lens according to claim 11 in which the mol ratio of vinylidene fluoride to hexafluoropropylene is 78:22.

* * * * *

UNITED STATES PATENT OFFICE
CERTIFICATE OF CORRECTION

PATENT NO. : 3,940,207
DATED : February 24, 1976
INVENTOR(S) : Archie E. Barkdoll It is certified that error appears in the above-identified patent and that said Letters Patent are hereby corrected as shown below:

Col. 2, line 9 - "polyer" should be --polymer--;

Col. 2, line 29 - "polyer" should be --polymer--;

Col. 2, line 42 - "surfaces" should be --surface--;

Col. 7, line 30 - "temperatures" should be --temperature--;

Col. 7, line 41 - "the" should be --The--;

Col. 8, line 68 - "the lens had" should be --The lens had--;

Col. 9, line 9 - "or" should be --of--;

Col. 10, line 31 - "2 ranges" should be deleted;

Col. 10, line 32 - "range" should be --ranges--.

Signed and Sealed this

Seventh Day of September 1976

[SEAL]

Attest:

RUTH C. MASON
*Attesting Officer*

C. MARSHALL DANN
*Commissioner of Patents and Trademarks*